United States Patent [19]
Drexler et al.

[11] Patent Number: 5,457,747
[45] Date of Patent: Oct. 10, 1995

[54] ANTI-FRAUD VERIFICATION SYSTEM USING A DATA CARD

[75] Inventors: Jerome Drexler, Los Altos Hills; Christopher J. Dyball, Half Moon Bay, both of Calif.

[73] Assignee: Drexler Technology Corporation, Mountain View, Calif.

[21] Appl. No.: 181,697

[22] Filed: Jan. 14, 1994

[51] Int. Cl.$^6$ ..................................... H04K 1/00
[52] U.S. Cl. .................. 380/24; 380/23; 340/825.33
[58] Field of Search ................. 380/23, 24, 25; 364/409; 395/933; 340/825.33, 825.34, 825.35; 235/380, 382, 386

[56] References Cited

U.S. PATENT DOCUMENTS

| | | | |
|---|---|---|---|
| 3,761,683 | 9/1973 | Rogers | 235/380 X |
| 4,683,371 | 7/1987 | Drexler | 235/487 |
| 4,745,268 | 5/1988 | Drexler | 235/380 X |
| 4,811,408 | 3/1989 | Goldman | 340/825.34 |
| 4,879,747 | 11/1989 | Leighton et al. | 380/23 |
| 4,961,229 | 10/1990 | Takahashi | 381/42 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,070,452 | 12/1991 | Doyle, Jr. et al. | 364/409 X |
| 5,241,165 | 8/1993 | Drexler | 235/380 X |
| 5,259,025 | 11/1993 | Monroe et al. | 380/23 |

OTHER PUBLICATIONS

"Smart Credit Cards—The Answer to Cashless Shopping"; Stephen B. Weinstein; IEEE Spectrum Feb. 1994 pp. 43–49.

*Primary Examiner*—Tod R. Swann
*Attorney, Agent, or Firm*—Schneck & McHugh

[57] ABSTRACT

A system for deterring fraudulent use of wallet-size cards in local benefit dispensing terminals has a permanent data storage medium and a temporary data storage medium disposed on each card. A first card writing device has means for acquiring biometric information from a person and for writing a template of that information on the permanent storage medium. A verification terminal has similar means for acquiring biometric information from a possessor of the card, and also has a means for reading the biometric information from the permanent storage medium of the card. Upon inputting biometric information from both the card and the possessor of the card, the verification terminal compares the information, and, if they match, writes data allowing limited benefits on the temporary data storage medium of the card. This data can be read by a plurality of existing benefit dispensers at other locations, such as automated teller machines, which can then dispense benefits authorized by the data. The limitation on benefits and the required repeated verification enhances security of the cards and the benefit dispensing system.

27 Claims, 3 Drawing Sheets

5,457,747

ANTI-FRAUD VERIFICATION SYSTEM USING A DATA CARD

TECHNICAL FIELD

The present invention relates to a system for deterring fraud in the use of personal identification cards.

BACKGROUND ART

Plastic cards carrying magnetic stripes are widely used as credit cards, debit cards, automatic teller machine (ATM) cards, telephone payment cards, etc. It is believed that billions of these cards are used throughout the world.

Typically, these cards hold approximately 200 alphanumeric characters, which is the same as 200 bytes of data in computer language. The magnetic stripe is erasable and is read and written by a wide variety of commercial devices.

A variety of methods are used to enhance the security of such cards and to discourage fraudulent use. Holograms are affixed to the cards to make card counterfeiting more difficult. Color face photographs of the registered card owner are affixed to the card for confirmation that the possessor of the card is the rightful owner. Personal identification numbers (PIN) are memorized by the card owner and entered into terminals such as bank ATM terminals to prove card ownership prior to cash payments to the card possessor.

In U.S. Pat. No. 4,683,371, Drexler teaches a dual strip card having both prerecorded data on a non-erasable strip and temporary data on a spaced apart, erasable strip.

In U.S. Pat. Nos. 4,879,747 and 4,995,081, Leighton et al. teach a method and system of encoding a password into a digital signature. The password may include a digitized photograph of the authorized cardholder which may be displayed at the transaction terminal.

U.S. Pat. No. 4,961,229 to Takahashi teaches a speech recognition system utilizing an IC card, and IC card reader, a microphone, and analyzer and a collating circuit, which are used together for identification of a person.

U.S. Pat. No. 4,993,068 to Piosenka et al. discloses a system for identifying users at remote access sites that encrypts physical characteristics of a user and stores the encrypted information in a computer, and then compares information received from a person requesting access at a remote site with that of the user to determine whether to allow access.

In U.S. Pat. No. 5,053,608, Senanayake discloses a personal identification system in which a user's fingerprint is recorded in encoded form permanently on an identification card and also temporarily in one of the secretly designated areas known only to the card holder and reader. This permanently encoded fingerprint is then compared with that of a fingerprint temporarily recorded at the time of use in one of the designated areas.

Finally, in U.S. Pat. No. 5,259,025, Monroe et al. teach a method of verifying the personal identity of an individual at a remote location by comparing video information received at the remote location with that previously recorded and stored at a central location.

In spite of all the anti-fraud methods currently used for obtaining credit, receiving cash, receiving miscellaneous benefits, etc., fraudulent use of magnetic stripe cards results in losses estimated at from many hundreds of millions of dollars to billions of dollars annually. The fraudulent methods involve a variety of techniques. Magnetic stripe cards are stolen. Lost cards are found and used. Cards are counterfeited. A person may apply for and have cards issued in the names of unsuspecting credit-worthy individuals. PIN numbers may be obtained by observing an ATM user entering his number or finding a PIN number noted in a lost or stolen wallet.

It is a current trend for welfare benefits to be paid out by electronic means. A number of states, including New Jersey and Maryland, have adopted Electronic Benefit Transfer (EBT) programs and many other states are considering EBT systems. The Health Security Act being proposed by the President and by some in Congress advocates the use of a plastic identification card which could evolve as a magnetic stripe card for health care providers to obtain payment from the health insurance alliances.

A recent analysis of the British total welfare program indicates that of $120 billion dispensed annually, $7 billion is obtained fraudulently. In Australia, an extensive study of welfare fraud indicates at least 5% to 15% of the welfare benefits are obtained fraudulently.

An objective of the present invention is to devise an anti-fraud verification, reverification, validation or authorization terminal for magnetic stripe cards to deter fraudulent use of such cards in Electronic Benefit Transfer systems for welfare programs, state entitlement programs, government-mandated healthcare programs, and the like.

SUMMARY OF THE INVENTION

The above objective is met by a system which includes a card having two data storage areas. In the first storage area, biometric identifying information of an individual is permanently recorded. The second area is used to write data authorizing limited use of the card to obtain benefits. This authorization data is written in the second area after matching the biometric information of the card holder with that stored on the first area of the card at a verification terminal. The first area may be an optical medium stripe or a semiconductor memory chip, and the second area preferably may be a magnetic stripe but the same optical medium stripe could also be the second area. The biometric information, which is stored at a first terminal, and later compared at the verification terminal, may be a fingerprint template, a template of a hand scan, signature data, a voice print, a retina scan, or a face photo. The use authorized by the data stored on the second area at widely available benefit dispensing terminals such as (EBT) terminals may be limited in time to a period of days, weeks or months or may be limited in the amount of benefit, form of benefit, starting date of the benefit, designation of family members who may use the card, or geography of the EBT terminals.

When the second area, such as a magnetic stripe is to be re-verified, the card is inserted into the verification terminal which reads the appropriate biometric data stored in the optical stripe or semiconductor memory chip. The verification terminal requires the possessor of the card to provide one or more of appropriate biometric types of information mentioned above. This newly acquired biometric data is compared to that previously stored on the card to determine if the card possessor is the same person as the registered owner. If this is confirmed in the verification terminal, the magnetic stripe is validated and authorized to provide benefits at EBT terminals for a given period of time, amount of use or other limit.

A verification, validation, or authorization code number and/or alphabet sequence can be modified based upon some information about the registered card owner. The modification could be based upon the name, biometric information, or other personal information. Thus, that verification code sequence could not be used by someone else. This type of individualized verification code thus would contain what is similar to a digital signature. This described verification procedure not only confirms the rightful owner, but also prevents a lost or stolen card from being re-validated. This procedure is conducted off-line.

The above procedure does not prevent someone from having a number of cards issued in different names so as to fraudulently obtain additional benefits. A second procedure can be followed by the verification terminal to prevent claiming benefits under a variety of names. Under this procedure, the biometric information entered into the verification terminal would also be sent by telecommunications to a central point where, for example, the electronic fingerprint would be compared with all fingerprints of all entitlement recipients to determine whether the same fingerprints have been used with other registered names. This procedure may be conducted on-line, or the biometric data may be periodically, electronically or physically collected from the verification terminals.

An advantage of the present invention is that it permits the installed base of magnetic stripe card equipment and systems to be used as is. Some or all of the magnetic stripe cards would be upgraded to a higher security level, where required, by replacing them with cards having a magnetic stripe and either an optical stripe or a semiconductor memory chip, which would not interfere with normal magnetic stripe operation. Although more expensive than EBT terminals, the number of verification terminals could represent only about 1 to 10 percent of the number of EBT terminals in use. They could be located in post offices, regional government buildings, shopping malls, selected supermarkets, and the like.

BEST MODE FOR CARRYING OUT THE INVENTION

Figure 1:
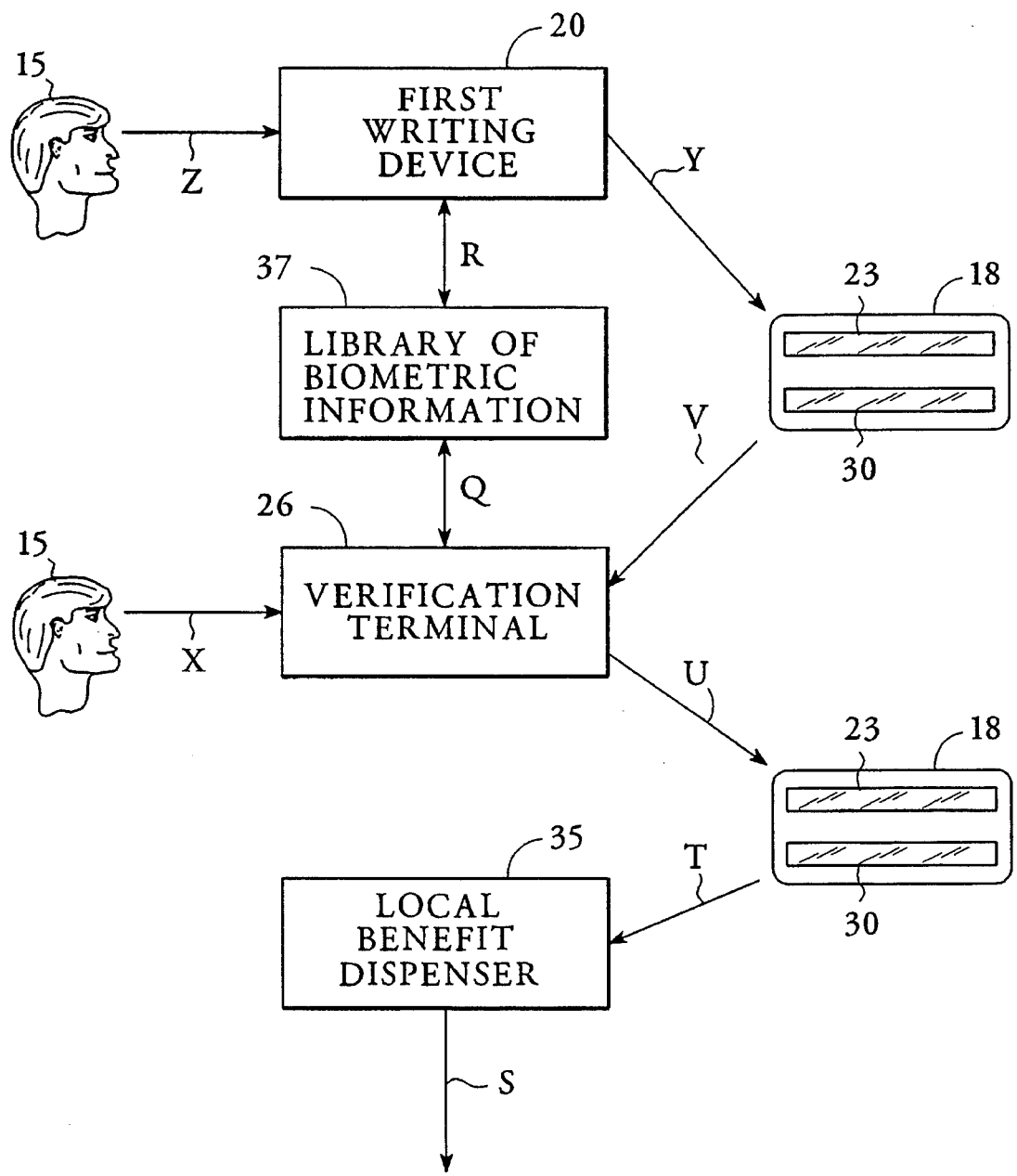
FIG. 1 is a diagram illustrating procedural steps in the system of the present invention.

Referring now to FIG. 1, a person 15 for which a personal identification card 18, preferably wallet size, is to be made, presents biometric information to a first writing device 20. The biometric information of the person 15 may include individual characteristics such as a fingerprint or fingerprints, a handprint, a voice-print, a facial picture, a retinal scan or a signature. The first writing device 20 has means for acquiring this biometric information from the person, represented by arrow Z.

The means for acquiring biometric information from a person used by first writing device 20 are not shown in this figure but may include commercially available electronic devices for receiving information relating to the person's face, fingerprint, handprint, retinal scan or signature. A microphone may be used for acquiring voice print information. A video recording device may be used for recording information in a manner which allows viewing and listening to such information over a period of time. With any of these acquisition means, the biometric information to be stored may be converted to a template or templates offering a compressed version of the data containing essential identifying features. The biometric information, or a compressed version of that information, may also be stored in an encoded form for enhanced security. The information which is stored may be any of the above listed types of biometric information or may be a combination of the above listed types of information.

The first writing device 20, after acquiring biometric information from the person, writes that information indelibly on a permanent data storage medium 23 of the card 18. This information is preferably written in a compressed or template form. The permanent data storage medium 23 may be an optically reflective strip which can be written by a laser recording device, the written areas thereafter read by the same or another laser at reduced power or a light emitting diode in order to retrieve the stored information. Alternatively, the permanent storage medium 23 may be a non-erasable memory such as a semiconductor chip which is recorded in a programmable read only memory (PROM), adapted for permanent recording. Any other medium which can store moderate to large amounts of information in a thin area which can be indelibly written upon and later retrieved can instead be used as the permanent storage medium 23, although an optical data storage device as described above is preferred as it affords a high data storage density, e.g. more than 2 k bytes is low cost and commercially available. After writing a template of the biometric information indelibly on permanent storage medium 23, first writing device 20 dispenses card 18 as shown by arrow Y. First writing device 20 may be located in an office that is responsible for dispensement of benefits, such as a welfare or social security office, or a bank associated with a credit or debit card.

In order to use the card 18 to obtain benefits, the person 15 takes the card 18 to a verification terminal 26. The verification terminal 26 has means for acquiring biometric information from the person 15 indicated by arrow X which is similar to the biometric information acquisition means utilized by first writing device 20. That is, any type of biometric information recorded by first writing device 20 can also be acquired from the person 15 by verification terminal 26. In fact, the invention may be practiced without a first writing device 20, by using the verification terminal 26 to perform the functions of the first writing device 20 as well as the other described functions of the verification terminal 26.

Verification terminal 26 receives the card 18 containing biometric information written indelibly on the permanent storage medium 23, as indicated by arrow V. Verification terminal 26 has a means for reading the template of biometric information stored on permanent storage medium 23. For example, if permanent storage medium 23 is an optical storage strip that has been recorded with a laser beam to store the template data, verification terminal 26 has a less powerful laser or light emitting diode beam that is directed at the medium 23 and a detector of reflected, transmitted or refracted light is used to read the data stored on the medium 23.

Verification terminal 26 also has a means for comparing the biometric template read from permanent storage medium 23 with the biometric information that the verification terminal 26 has acquired from the person 15. This means for comparing biometric information will typically include a microprocessor, not shown in this figure. If the biometric information from the card 18 matches that from the person 15, the identity of the person 15 has been verified, and the verification terminal 26 writes authorization data on a temporary storage medium 30 of the card 18, as indicated by arrow U. Typically the capacity of storage medium 30 is low, typically about 200 bytes. The data written on temporary storage medium 30 is authorization data which allows the card 18 to be used to obtain limited benefits. The benefit which can be obtained by the card 18 is limited in order to maintain the integrity of the card 18 by frequent verification of the identity of the possessor of the card 18. Should the person 15 have different biometric information than that indelibly recorded on the permanent storage medium 23, the comparison would not match and the card would not be imprinted with authorization data allowing limited use. The comparison would be made several times before a negative conclusion is reached. Alternately storage medium stripe 23 and storage medium stripe 30 could be two parts of one optical medium stripe.

In addition, other measures may be employed by the verification terminal 26 in response to a confirmed mismatch, such as surreptitiously photographing the person 15 or activating an alarm to enable apprehension of the person 15. There is, however, a possibility of inaccuracy in matching biometric information. The use of fingerprints for matching of biometric information permits approximately one unauthorized person to be accepted out of 100,000 acceptances. Handprint matching is faster, but the chance of unauthorized acceptance may be one chance in one thousand. To improve handprint accuracy, matching of handprints may be combined with matching biometric information of another individual feature. Further combination of matching would yield further reduction in this type of error.

Temporary storage medium 30 is typically a magnetic storage stripe affixed to a plastic card, which can be read and rewritten, and for which a large base of terminals which can read data from the temporary storage medium are already in place. Such previously installed benefit terminals include automatic teller machines (ATM), credit card type readers and the like.

After temporary storage medium 30 of card 18 has been written with data allowing limited use, the card 18 can be brought to a local benefit dispenser 35 as depicted by arrow T. Local benefit dispenser 35 reads the card 18, and thereupon dispenses benefits as shown by arrow S to the extent allowed by the data written on temporary storage medium 30. Local benefit dispenser 35 may be an existing ATM or credit card reader, as described above, or it may be a machine installed for the use of the present invention.

One such local benefit dispenser 35 may be located in the general vicinity of each verification terminal 26 used as first writing devices, but many other distal benefit dispensers 35 may exist for each verification terminal 26. The verification terminals 26 may be installed in secure, convenient locations, such as post offices, shopping centers or city, county, state or federal buildings. Local benefit dispensers 35 may outnumber verification terminals 26 by a factor of ten or more to one. For example, in the State of Ohio, there will be an estimated 25,000 EBT terminals. The verification and reverification terminals might total 250 to 2500.

The form of benefits authorized by the data written on temporary medium 30 may include cash, payments for goods or services, vouchers, food stamps, Aid to Families with Dependent Children (AFDC) payments, Woman, Infant and Children (WIC) programs, General Assistance (GA) benefits, Child Immunization benefits, Medicaid, Medicare and Health Security Act program categories. The geography in which benefits are authorized may include specific cities, states, countries, or specific EBT terminals within those regions.

The authorization data written on temporary storage medium 30 may allow use that is limited in amount, limited in time, limited in form, limited in geography, or have a combination of these limits. For example, that data may only allow benefits to be dispensed from a local benefit dispenser for a day, a week or a month from a starting time. On the other hand, the data may allow only one hundred dollars worth of food stamps to be dispensed, or may allow up to that amount of food stamps to be dispensed for one month after the time of verification. This limit on the benefits which can be obtained from the card 18 before re-verification creates a ceiling on the benefits that can be fraudulently obtained.

In order to circumvent fraudulent use of multiple cards 18 by a person entitled to use only one card 18, a library of biometric information 37 can be maintained. The library 37 can be in communication with both the first writing devices 20 and verification terminals 26 used as first writing devices, as shown by arrows R and Q, respectively. When biometric information is acquired from a person 15 at first writing device 20, that information is checked against the other biometric information on file at the library 37. Should matching biometric information exist at the library 37 under another name, the issuance of a card 18 written indelibly with such information on permanent storage medium 23 is averted, and apprehension measures may additionally be actuated. Upon receiving biometric information which does not match that already on file at the library 37, that information is added to the library 37 along with corresponding common identification data such as the person's name, social security number, benefit program, etc. Since comparing the biometric information with what is in the library takes considerable time it would preferably be done with the first writing device.

Communication between the verification terminals 26 when used as a first writing device and the library 37, illustrated by arrow Q, can also be used to circumvent fraud. Should biometric information contained on permanent storage medium 23 match with such information on file at the library under another person's name, data allowing limited benefits to be obtained would be denied, and apprehension measures may additionally be employed. In these examples, apprehension may be aided by the fact that a name and address used by the person is on file.

Figure 2:
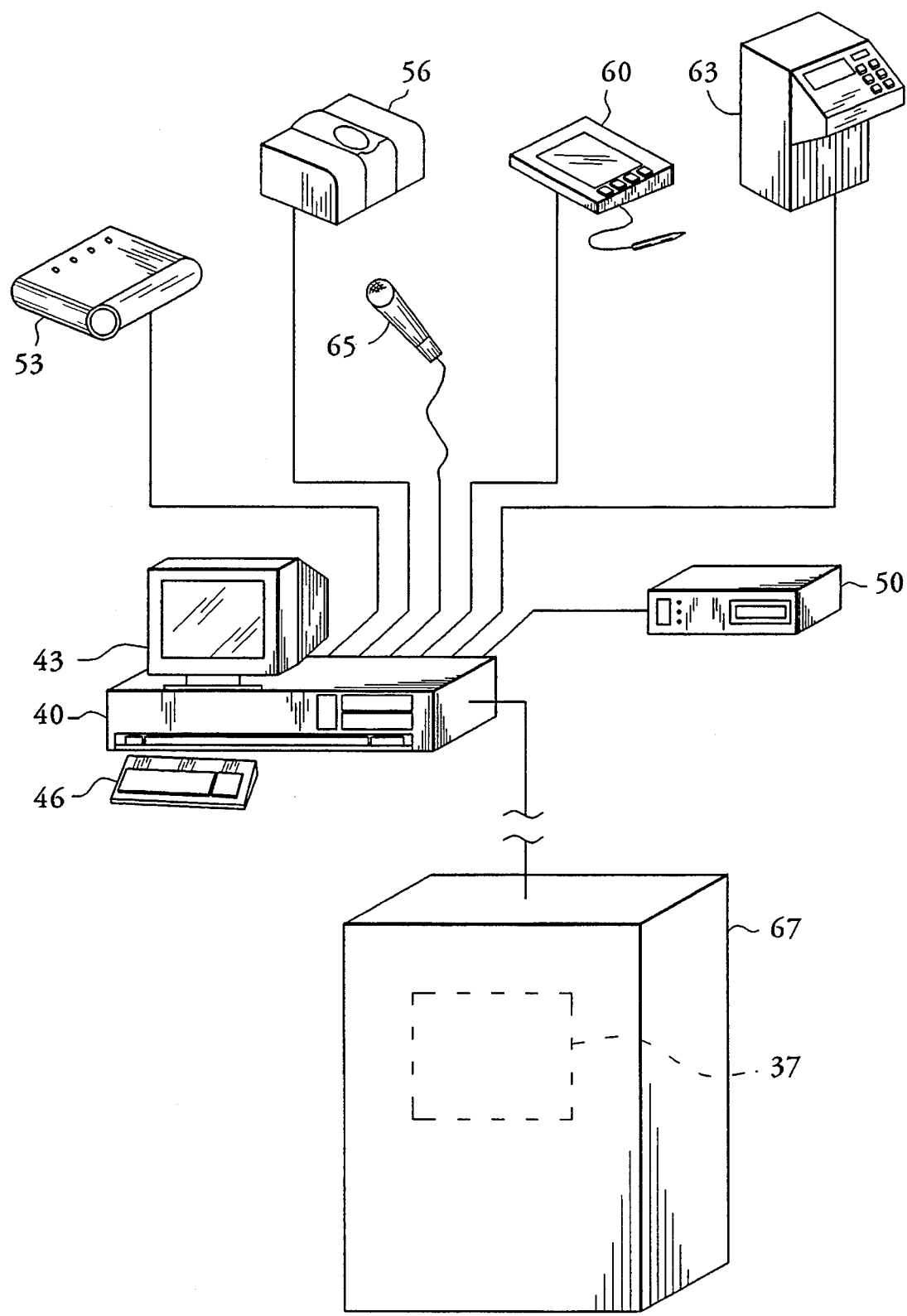
FIG. 2 is a plan view of devices used for acquiring, storing, reading and comparing biometric information of the invention of FIG. 1.

Referring now to FIG. 2, five types of biometric recording devices are illustrated, each connected to a computer 40 including a monitor 43 and a keyboard 46. Only one type of biometric data is needed, but several possibilities are illustrated in FIG. 2. Also connected to the computer 40 is a card read/write device 50. The keyboard 46 and computer 40 are also used for acquiring common identification from the person, such as the person's name, social security number, date of birth, etc., to be recorded on the permanent storage medium 23.

An electronic camera 53 for taking a picture of a person's face or a retinal scan may be employed for acquiring biometric information. Such a camera may utilize a charge coupled device (CCD) capable of sending a digital representation of the picture to the computer 40, which may in turn extract characteristic information from the picture to be recorded as a template on the permanent storage medium 23 or compared with template information read from the permanent storage medium 23. A fingerprint reader 56 can similarly scan a person's fingerprint, and may acquire a two or three dimensional picture of the fingerprint for transmission to the computer 40.

An electronic signature reader 60 can electronically record and transmit to the computer 40 a digital representation of a person's signature. That signature can be enlarged and displayed on the monitor 43 adjacent a previously recorded signature for visual comparison. Alternatively, the computer 40 can compare the signatures to determine whether they match, or both a human determined and computer 40 determined comparison can be made. A handprint reader 63 can also be connected to the computer 40 to capture and compare a three dimensional digital representation of a person's hand. A microphone 65 can capture a person's voice, and a sound card within the computer 40 can store a digital voice print.

The computer 40 is also able to communicate with a central library 37, which may be housed within a mainframe computer 67 having extensive memory capacity. Alternatively, the library 37 may be comprised of an interconnected network of verification terminals 26 and first writing devices 20.

All of the devices shown in FIG. 2 except for the mainframe computer 67 may together constitute a verification terminal 26, including one or any combination of the five biometric recording devices shown. A first writing device 20 may be comprised of one or any combination of the five biometric information recording devices shown, in connection with a card read/write device 50.

Figure 3:
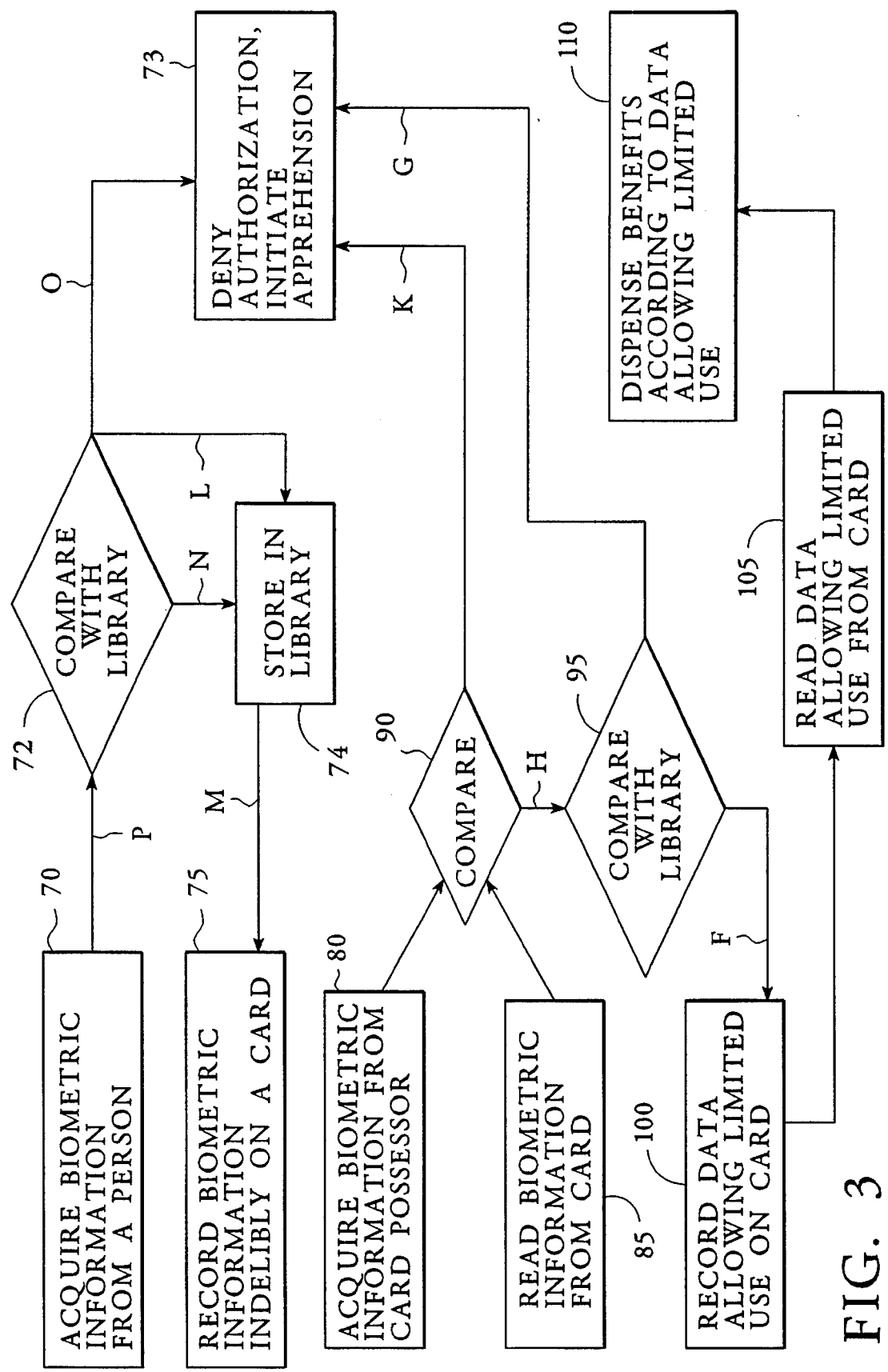
FIG. 3 is a flow chart illustrating use of the system shown in FIG. 1.

FIG. 3 shows an outline of the steps and system of the present invention. At either a first writing device or verification terminal used as a first writing device, biometric information is acquired from a person, as illustrated by block 70. A digital representation of this information, as provided by biometric recording device, is sent via telecommunications such as radio waves or phone lines to the library, as shown by arrow P, where it is compared, as shown by block 72, with the biometric information at the library. If this comparison yields a match with biometric information under a different name, social security number or other common identification, as shown by arrow 0, authorization for benefits is denied, and apprehension measures may be initiated, as shown in block 73. If the biometric information given by the person does not match any such information at the library 74, with input along line N, it is stored at the library, along with the name and any other commonly used identification data. A signal is also sent from the library to the terminal where this information was acquired, as shown by arrow M, authorizing recording of this information on a card. According to block 75, this information is then recorded indelibly on a card. If the biometric information acquired from the person matches such information on file at the library, and the name and other common identification is identical with that given, indicating a lost or stolen card, as indicated by arrow L, additional information is stored at the library 74 indicating that a replacement card has issued, and a signal is sent, shown by arrow M, to the terminal, where the biometric information was acquired authorizing recording, as illustrated in block 75, of the biometric information indelibly on a card, along with the common identification information and the information that the card is a replacement card.

At a verification terminal, biometric information is acquired from the possessor of the card, as shown in block 80. Biometric information is also read from the card, according to block 85. The order of performance of blocks 80 and 85 is immaterial. The biometric information of the card and of the possessor of the card is then compared 90. If the biometric information on the card and that of the possessor of the card do not match, steps 80, 85 and 90 are repeated to confirm a mismatch. If a mismatch is confirmed, as shown by arrow K, authorization is denied, as shown by block 73, and apprehension measures may be initiated. Most verification terminals would not be connected through telecommunications to the library. In the event that there is such a connection then additional steps may be taken as follows. If the information of the card and the possessor of the card match, that information is then sent by telecommunications to the library, as shown by arrow H, where it is compared 95. If the information matches biometric information at the library corresponding to a different name or other common identification, as indicated by arrow G, authorization is denied and apprehension may be initiated 73. Similarly, if the information matches that at the library but the library indicates that a replacement card has been issued and the information on the card lacks the additional information indicating that it is a replacement card, authorization is denied and apprehension may be initiated 73. If, on the other hand, the information sent to the library matches that at the library under the same name and other common identification, as shown by arrow F, a signal is sent to the verification terminal authorizing limited benefits, which are recorded 100 on the card on the temporary storage medium.

At a local benefit dispenser the data authorizing limited use that has been recorded on the temporary storage medium of the card is read 105. The local benefit dispenser thereupon dispenses benefits according to that allowed by the data on the temporary storage medium 110.

Once those benefits have been exhausted, a possessor of the card must revisit the verification terminal in order to obtain further benefits. In this manner the security of the card and the benefit dispensing system are enhanced.

We claim:

1. A personal benefit card system comprising, a personal identification card having a first and a second data storage medium, said first medium capable of being written with data indelibly, said second medium capable of being written repeatedly, a verification terminal having means for acquiring biometric identification and common identification information from a person, for indelibly writing said first medium with said biometric identification information, for subsequently reading said biometric identification information of said first medium, for comparing said biometric identification information read from said first medium with that of a possessor of said card, and for writing data on said second data storage medium in response to a favorable comparison, said data authorizing limited use of said card, an identification library having means for communicating with said verification terminal, means for storing said biometric identification and associated common identification information of a person, and means for comparing said information with previously stored information such that a duplication alert is sent to said verification terminal if said biometric identification matches a biometric identification previously stored and said associated common identification differs from an associated common identification previously stored, and a plurality of local benefit dispensing terminals having means for dispensing benefits in response to reading said data authorizing limited use of said card.

2. The system of claim 1 further comprising a first card writing device having means for acquiring said biometric identification and common identification information of said person, for indelibly writing said first medium with said biometric identification and common identification information, and for communicating with said identification library.

3. The system of claim 1 wherein said data authorizing limited use of said card includes a limitation of a time period that said benefits are dispensed.

4. The system of claim 1 wherein said data authorizing limited use of said card includes a limitation of a form of benefit which is dispensed.

5. The system of claim 1 wherein said data authorizing limited use of said card includes a limitation of a geography in which said benefits are dispensed.

6. The system of claim 1 wherein said data allowing limited use of said card includes a limitation of an amount of said benefits that can be dispensed.

7. The system of claim 1 wherein said first medium includes an optical recording stripe.

8. The system of claim 1 wherein said first medium includes a semiconductor memory chip.

9. The system of claim 1 wherein said second medium includes a magnetic recording stripe.

10. The system of claim 1 wherein said first medium and said second medium include an optical recording stripe.

11. A personal benefit card system comprising, a personal identification card having a first and a second data storage medium, said first medium capable of being written with data permanently, said second medium capable of being written repeatedly, a verification terminal having means for acquiring biometric information from a person, for indelibly writing said first medium with said biometric information, for subsequently reading said biometric information of said first medium, for comparing said biometric information read from said first medium with that of a possessor of said card, and for writing data on said second data storage medium in response to a favorable comparison, said data authorizing limited use of said card, a plurality of local benefit dispensing terminals having means for dispensing benefits in response to reading said data authorizing limited use of said card, and a plurality of said verification terminals that number less than 10% of said plurality of local benefit dispensing terminals.

12. A personal benefit card system comprising, a card having a permanent storage medium disposed adjacent a temporary storage medium, a first writing device having means for acquiring biometric information of an individual and for indelibly writing a template of said biometric information on said permanent storage medium, a verification terminal having means for reading said template written on said card, for acquiring biometric information of an individual possessing said card, for comparing said template with said biometric information of said individual possessing said card and for writing data on said temporary storage medium allowing limited benefits, a plurality of benefit dispensing terminals having means for reading said data on said temporary storage medium and for dispensing benefits in accordance with said limited benefits, and a plurality of said verification terminals that number less than 10% of said benefit dispensing terminals.

13. A personal benefit card system comprising, a card having a permanent storage medium disposed adjacent a temporary storage medium, a first writing device having means for acquiring biometric identification information of an individual and for indelibly writing a template of said biometric identification information on said permanent storage medium, a verification terminal having means for reading said template written on said card, for acquiring biometric identification information of an individual possessing said card, for comparing said template with said biometric identification information of said individual possessing said card and for writing data on said temporary storage medium allowing limited benefits, and a plurality of benefit dispensing terminals having means for reading said data on said temporary storage medium and for dispensing benefits in accordance with said limited benefits, each of said plurality of benefit dispensing terminals having a geographical location different from a geographical location of said verification terminal.

14. The system of claim 13 wherein said biometric identification information includes a fingerprint.

15. The system of claim 13 wherein said biometric identification information includes a handprint.

16. The system of claim 13 wherein said biometric identification information includes a retina scan.

17. The system of claim 13 wherein said biometric identification information includes a voice print.

18. The system of claim 13 wherein said biometric identification information includes a signature.

19. A method for ensuring the identity of a holder of a personal identification benefit card comprising, acquiring biometric information and common identification from a person and recording said biometric information and common identification indelibly on a card, comparing said biometric information recorded on said card with subsequently acquired biometric information of a person possessing said card at a verification terminal, writing verification data on said card authorizing limited use of said card if said comparison yields substantially matching biometric information, and dispensing a benefit at a benefit terminal in response to reading said verification data, wherein said comparing said biometric information and said dispensing a benefit are performed at locations distal to each other.

20. A method for ensuring the identity of a holder of a personal identification benefit card comprising, acquiring biometric information and common identification from a person and recording said biometric information and common information indelibly on a card, comparing said biometric information recorded on said card with subsequently acquired biometric information of a person possessing said card at a verification terminal, writing verification data on said card authorizing limited use of said card if said comparison yields substantially matching biometric information, dispensing a benefit at a benefit terminal in response to reading said verification data, and comparing said biometric information and said common identification of said person with a library of biometric information and common identification stored at a central location, prior to recording said biometric information and said common identification indelibly on said card, preventing said recording of said biometric information and said common identification of said person indelibly on said card if said library has biometric information substantially matching said biometric information of said person corresponding to a different common identification, storing said biometric information of said person in said library, if said library does not have biometric information substantially matching said biometric information of said person, and recording information designating a replacement card indelibly on said card and storing information designating a replacement card in said library, if said library has biometric information substantially matching said biometric information of said person corresponding to said common identification.

21. A method for ensuring the identity of a holder of a personal identification benefit card comprising, acquiring biometric information and common identification from a person and recording said biometric information and common identification indelibly on a card, comparing said biometric information recorded on said card with subsequently acquired biometric information of a person possessing said card at a verification terminal, writing verification data on said card authorizing limited use of said card if said comparison yields substantially matching biometric information, and dispensing a benefit at a benefit terminal in response to reading said verification data, comparing said biometric information and said common identification recorded on said card with a library of biometric information and common identification stored at a central location, prior to writing data on said card allowing limited use of said card, and preventing writing data on said card if said biometric information at said library has substantially matching biometric information corresponding to a different common identification.

22. A method for ensuring the identity of a holder of a personal identification benefit card comprising, acquiring biometric identification information and a common identification from a person and recording said biometric identification information and common identification indelibly on a card, storing said biometric identification information and said common identification in a library separate from said card, comparing said biometric identification information recorded on said card with subsequently acquired biometric identification information of a person possessing said card at a verification terminal, detecting fraudulent use of multiple personal identification benefit cards, including a substep of comparing said subsequently obtained biometric identification information with biometric identification information stored in said library, a substep of comparing common identification information recorded on said card with common identification information stored in said library, and initiating an alert if said substep of comparing biometric information results in a match and said substep of comparing common information results in a mismatch, writing verification data on said card authorizing limited use of said card if said comparison yields substantially matching biometric identification and common identification information, and dispensing a benefit at a separate benefit terminal in response to reading said verification data.

23. The method of claim 22 wherein said comparing said biometric identification information and said writing verification data on said card are performed at a similar location and a similar time.

24. The method of claim 19 wherein authorizing limited use of said card includes limiting a time period for which said benefits may be dispensed.

25. The method of claim 19 wherein authorizing limited use of said card includes limiting an amount of said benefits which may be dispensed.

26. The method of claim 19 wherein authorizing limited use of said card includes limiting a form of benefit which may be dispensed.

27. The method of claim 19 wherein authorizing limited use of said card includes limiting a geography in which said benefits may be dispensed.

* * * * *